Feb. 28, 1933. T. E. MURRAY Re. 18,748

BOILER AND THE LIKE

Original Filed June 1, 1923 3 Sheets-Sheet 1

INVENTOR:- THOMAS E. MURRAY, DECEASED.
BY JOSEPH B. MURRAY, JOHN F. MURRAY, THOMAS E. MURRAY, JR. } EXECUTORS

BY HIS ATTORNEYS

Usina & Rauber

Feb. 28, 1933. T. E. MURRAY Re. 18,748

BOILER AND THE LIKE

Original Filed June 1, 1923 3 Sheets-Sheet 2

INVENTOR
THOMAS E. MURRAY DECEASED
BY JOSEPH B. MURRAY, JOHN F. MURRAY, THOMAS E. MURRAY, JR. } EXECUTORS
BY HIS ATTORNEYS
Usina & Rauber Feb. 28, 1933. T. E. MURRAY Re. 18,748

BOILER AND THE LIKE

Original Filed June 1, 1923 3 Sheets-Sheet 3

INVENTOR:- THOMAS E. MURRAY DECEASED.
BY JOSEPH B. MURRAY, JOHN F. MURRAY, THOMAS E. MURRAY, JR. } EXECUTORS.

BY HIS ATTORNEYS

Ulina & Rauber

Reissued Feb. 28, 1933 Re. 18,748

UNITED STATES PATENT OFFICE

THOMAS E. MURRAY, DECEASED, LATE OF BROOKLYN, NEW YORK, BY THOMAS E. MURRAY, JR., JOSEPH B. MURRAY, AND JOHN F. MURRAY, EXECUTORS, OF BROOKLYN, NEW YORK, ASSIGNORS TO METROPOLITAN ENGINEERING COMPANY, A CORPORATION OF NEW YORK

BOILER AND THE LIKE

Original No. 1,746,711, dated February 11, 1930, Serial No. 642,725, filed June 1, 1923. Application for reissue filed May 19, 1930. Serial No. 453,838.

The invention relates in general to heaters for various fluids and is designed particularly for heating water or superheating steam in boilers. In a previous application No. 642,427, he described a boiler construction including tubes with plates or other heat-conducting elements between them. The present application is based specifically on certain improvements over the structure of the above application. It includes also certain separate features of novelty.

The invention is illustrated in the accompanying drawings in which Fig. 1 is a perspective view with portions sectioned off showing an embodiment of the invention;

Figure 2:
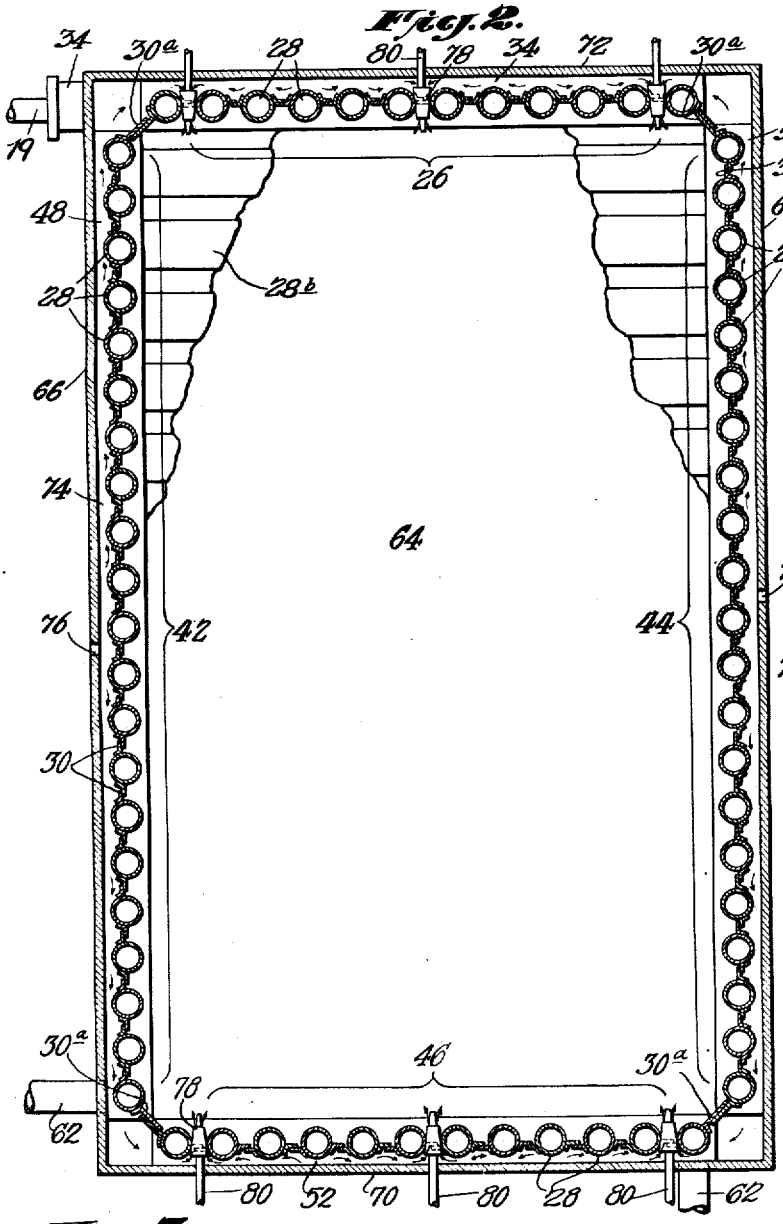
Fig. 2 is a horizontal section through the combustion chamber of the boiler of Fig. 1.

Referring in detail to the drawings, the boiler includes front and rear headers 10 and 12 of usual construction connected by boiler tubes 14 and a steam drum 16 connected by nipples 18 to the headers 10 and by pipes 20 to the headers 12. The headers 10 are supported on a tubular member 22 extending transversely for the full width of the boiler, and similarly the headers 12 are supported by a tubular member 24. The rear transverse member 24 is supported by a hollow cross-member 27 forming part of the rear wall 26 of the boiler, this wall being made up of a plurality of tubular members 28 spaced apart from one another as shown in Fig. 2.

Figure 6:
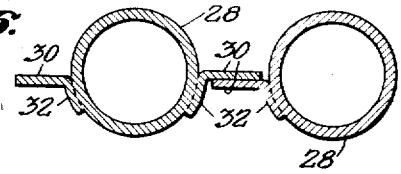
Fig. 6 is a fragmentary view illustrating the construction of tubular wall members and closure members secured thereto.

Each member 28 has a closure member secured thereto which comprises an outwardly extending longitudinal plate 30 and a plate 32 welded or otherwise secured to the outer surface of the member 28. As shown in Fig. 6, the plates 30 of the adjacent members overlap one another and effectively close the space between the adjacent members. These overlapping plates are not rigidly attached to one another, but are merely loosely held in engagement with one another so as to permit expansion and contraction of the wall.

The tubular members 28 are secured at their lower ends to a hollow box-like member 34 forming in effect a lower sill for supporting the wall 26. The tubular members 28 may be shouldered as at 36, Fig. 8, so as to form a seat on the member 34 and the joint may be welded or otherwise made steam-tight. In some cases the ends of the members 28 will be rolled over as at 38 and when this means of forming the joint is employed, the member 34 will be formed with openings opposite the members 28 to permit the insertion of a rolling tool. Plugs 40 will be employed to close such openings.

The rear wall 26, including the cross members 27 and 34 form a hollow or cellular steam-tight structure which is adapted to serve as a superheater. The wet steam from the drum 16 passes through the pipe 17 to the cross member 27 and is superheated by contact with the hot surfaces of the multiplicity of members 28 forming the rear wall. An outlet pipe 19 is connected to the lower hollow sill member 34 to convey the superheated steam to the desired point.

The side walls 42 and 44 and the front wall 46 are also each composed of a multiplicity of tubular members 28 spaced apart as shown in Fig. 2, and the spaces between such members are closed by fin or plate members 30 as shown in Fig. 6, and described in connection with the rear wall 26. These members are connected at their lower ends with hollow sill members 48 and 50 at the sides and with a sill 52 at the front end.

The front wall 46 which is carried by the member 52 supports at its upper end a hollow cross member 54. Rearwardly extending members 56 and 58 are connected with the tubular cross member 54 by suitable nipples and at their rear ends these members 56 and 58 are similarly connected with the member 22.

The members 56 and 58 are connected by hollow members 28[a] similar in construction to those above referred to and provided with similar fin portions 30 so as to form a top wall or roof 60 over the forward portion of the boiler forming in effect what in this art is known as a Dutch oven.

Figure 1:
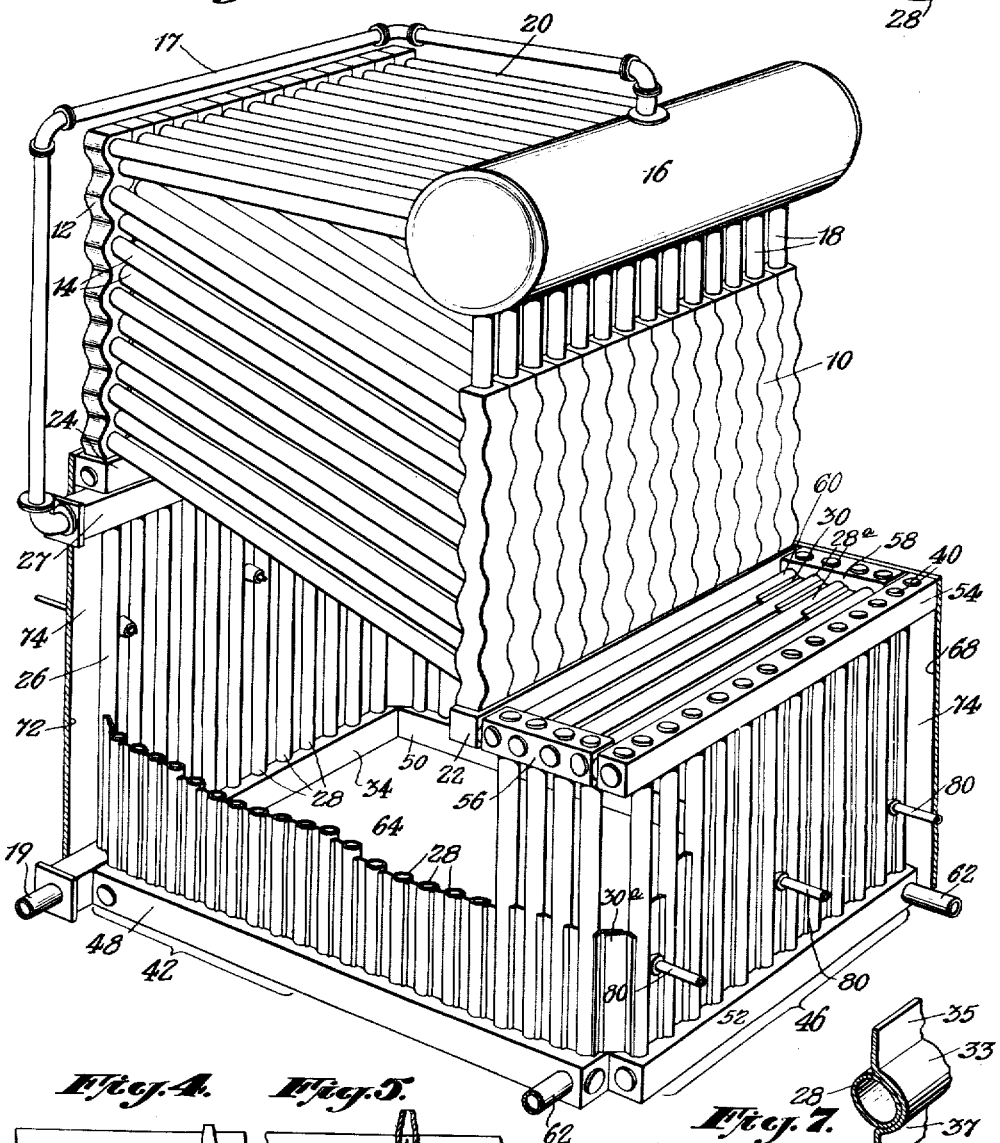
Figure 8:
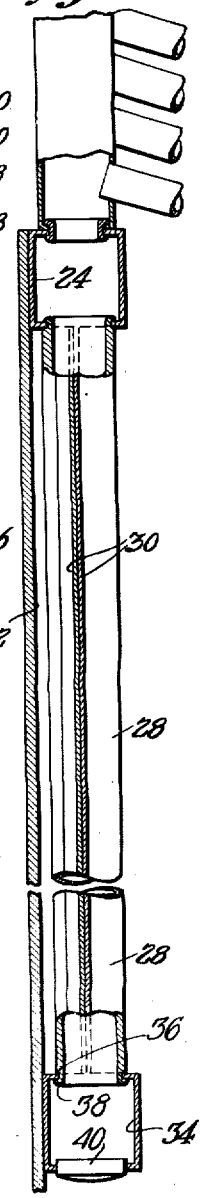
Fig. 8 is a fragmentary vertical section through one wall of the boiler.

The sill members 34, 48, 50 and 52 as above described are of hollow construction and as shown in Fig. 8 are in open communication with the tubular members 28 so that in effect they form headers. The members 24, 54, 56 and 58 are similarly connected and also form headers connecting with the tubular members 28. This arrangement provides a construction in which steam can be circulated through the back wall to be superheated as above described and water can be circulated through the side and front walls of the boiler and also through the roof 60 of the Dutch oven portion. Feed water is supplied to the boiler through one or more pipes connected to any of the sill members, for example as by means of pipes 62 shown in Fig. 1, entering the sides of the sill members 48 and 52.

The comparatively cool water entering the pipe or pipes 62 is circulated through the sill members and through the tubular members 28 of the several walls. The sill members 48 50 and 52 may each be connected with a separate water supply or they may be connected by pipe connections, not shown, so as to permit of a circulation between the separate sections; such an arrangement being shown and claimed in his co-pending application No. 61,386, filed October 9, 1925. And in his co-pending application No. 719,696, filed June 13, 1924, he showed and claimed a specially advantageous complete circulating system. The side walls 42 and 44 of the boiler may extend up to the full height of the tubes 20 so as to enclose the entire bank of water tubes and the top of the boiler may be closed in any suitable manner and suitable flues leading to the stack may be provided. These arrangements are not shown in the drawings as the specific design forms no part of the present invention and various known arrangements can be adopted without departing from the invention.

At the corners where the walls 42 and 44 meet the end walls 26 and 46, the space between the adjacent tubular sections 28 is closed by overlapping plates 30[a] similar to the members 30 which close the spaces between the various members of the walls. The walls 42, 44, 26 and 46 enclose a chamber 64 within which combustion of fuel takes place as hereinafter described.

Surrounding the inner walls which are made up of the members 28, is an outer structure composed of side walls 66 and 68, front and rear end walls 70 and 72. These walls are separated from the hollow walls a short distance so as to form a surrounding air space 74. Openings 76 are provided in the outer wall to permit air to enter the air space and means are provided for introducing air from this space into the combustion chamber.

Figure 4:
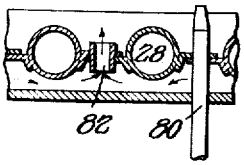
Figs. 4 and 5 are details of modified arrangements for supplying fuel and air to the boiler.
Figure 3:
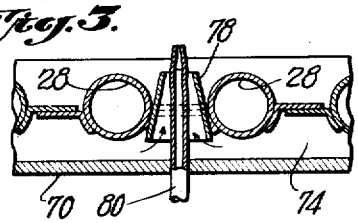
Fig. 3 is a detail showing means for supplying fuel and air to the combustion chamber of the boiler.

As shown in Fig. 3, a conical sleeve 78 is located between two of the members 28 and forms a passage-way through which air can flow from the air space 74 to the combustion chamber 64 as shown by the arrows. A fuel pipe 80 passes through the wall 70 and extends axially through the sleeve 78. Suitable fuel such as oil, gas or pulverized coal is delivered through the pipe 80 or coal may be introduced by hand or stoker, and this fuel mixes with the air flowing from the space 74 through the sleeve 78 and combustion takes place inside of the chamber 64. There may be several of these burners according to requirements and in Fig. 2 six burners are illustrated. Instead of passing the fuel pipe through the sleeve 78 through which the air passes, this pipe may pass directly through the plates 30 between adjacent members 28 as shown in Fig. 4 and the air to support combustion may pass through separate conduits 82 as shown.

The inner water tube wall and the outer wall 66 thus form a channel with lateral openings, and combustion air is supplied to this channel and passes laterally out of it through the openings 82 into the combustion chamber. The flanged or finned tubes constitute a wall of the passage or channel for the combustion air, the fins being interrupted to provide ports between the water tubes for admission of the air to the combustion chamber.

Figure 5:
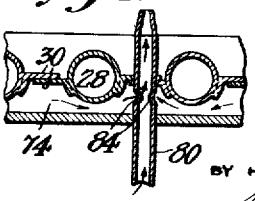

In Fig. 5, is shown a slightly modified arrangement wherein the fuel pipe 80 is provided with openings 84 through which the air from the air space 74 is drawn as the fuel is forced into the combustion chamber.

Figure 7:
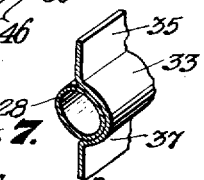
Fig. 7 shows an alternative construction which may be used in place of that shown in Fig. 6.

Instead of closing the space between the adjacent tubular members 28, by means of flanged members 30, 32 above described, there may be used a formed plate as shown in Fig. 7 having an arcuate portion 33 and outwardly extending fins or plates 35 and 37. These fins will contact with and overlap similar fins on adjacent tubular members 28 as will be understood.

From the foregoing it will be perceived that the multiplicity of tubular members 28 provide means whereby the water or steam may be circulated through the walls of the boiler. These members are connected at top front of the tubes and, lying in this intermediate space, are well in front of the outer wall, no matter how closely this may be brought up to the backs of the tubes. The use of two such plates bridging each space has an advantage in providing a short path for the conduction of heat from the plates to the respective tubes. It is also an advantage to use sheet metal or rolled steel shapes as indicated and to weld them to the tubes. Such rolled steel has a toughness and durability which particularly adapts it for the use in question, and by welding them to drawn steel tubing a unit is produced which is particularly well fitted to the conditions of use.

It is a matter of great advantage that the plates between the tubes are exposed directly to the radiant heat of the burning fuel in the combustion chamber, so that the inner sides of the tubes and the intermediate plates present a wide exposure to such radiant heat in proportion to the quantity of water flowing through the tubes. The heating effect obtained in this way is very much greater than that which is obtained by circulation of the hot gases out of direct line with the burning fuel. The boiler of this invention is particularly adapted for generating high pressure steam and for utilizing the extremely high temperatures in the combustion chamber which can be obtained with the nozzle type of burners described, projecting powdered coal or liquid or gaseous fuel into the combustion chamber. The highest temperatures obtainable in this way cannot be used in ordinary boilers with masonry walls forming the combustion chamber and exposed to the radiant heat. By interposing on the inner face of the masonry wall a water wall of the character described, a boiler of a given size can be run at a rating (of water evaporated per hour) very much higher. Or for an industrial plant requiring a certain quantity of steam, the number of boilers necessary can be considerably reduced compared with the present standards.

The use of coal dust in connection with the wall of water tubes has a particular value which has been demonstrated in actual installations. The natural tendency of water cooled walls is to absorb heat and thus impair combustion and cause smoking.

A refractory surface heated to incandescence has generally been regarded as important in assisting the rapid combustion of particles of coal dust. It has been found in practice that the water wall of this invention, with the water circulating rapidly therethrough quickly takes on the appearance of the old type refractory wall heated to incandescence. This is due to a coating of very fine lightly adherent ash from the jets or flames of coal dust. In the old fashioned refractory furnace such ash is deposited in a plastic state forming a slag.

In the water cooled furnace of this invention the particles on striking the wall are immediately cooled below the slagging temperature (if they were above that temperature) and adhere to the surface like a coat of dust. Since the ash does not adhere closely to the metal, the conduction of heat of the latter is not rapid and the temperature of the ash remains considerably higher than that of the metal. The ash builds out from the metal and the outer portion attains a temperature high enough to provide the incandescent surface of refractory material which is important in the continuous maintenance of rapid and complete combustion, with a minimum of smoke. The layer of ash finds a limit in thickness which prevents the surface particles from attaining a fusing temperature, maintaining an approximate balance at which the maximum evaporating effect can be produced without objectionably retarding combustion. The ash falls off the tubes at times but immediately builds up again. It is sufficiently adherent to the tubes to impart the necessary heat to them but is not sufficiently cohesive to build up to an objectionable thickness.

His improved boiler is designed to produce steam at a rate of several hundred per cent of the usual rating based on area exposed to the heating gases and requires for this result a high volume of intensely hot gas. It becomes important therefore to prevent the exposure of the usual masonry wall to the fire. Experience shows that such walls are rapidly deteriorated under modern high temperature firing. The metal fins or extensions of his improved boiler form a shield which protects any outside sheathing.

Such extensions have an additional function to conduct heat to the water tubes so rapidly as to utilize the intense heat of the fire. In installations of this character the distance to which the extensions may be carried beyond the tubes is limited. It must be so short that the heat is conducted to the tubes sufficiently rapidly to prevent the outer portions of the extensions from being burned away or distorted sufficiently to crack them. Such conduction of heat to the tube is affected by the area and the degree of contact of the extension member with the tube, but is chiefly dependent on the distance from the tube to the remotest part of the extension. Such distances puts a maximum limitation on the distance between the tubes in the case of high duty boilers (that is, steam generators as distinguished from mere water heaters or the like).

In practice, he found that the maximum distance should not be substantially greater than the outside diameter of the tubes. The extensions beyond the tube, with such spac- and bottom by box-like members as, for example, 24 and 34, Fig. 8, which serve as headers and also as supporting members. The hollow members 24 and 22 are connected by suitable nipples with the boiler headers 10 and 12 as will be understood. Circulating the feed water through the walls enables one to use metallic walls instead of brickwork or masonry walls heretofore used for stationary boilers, and this water, of course, absorbs heat which would be lost in constructions where brick walls or the like were used. The walls, therefore, in effect form a superheater for the steam, a preheater for the boiler feed water, and also help to preheat the combustion air; besides generating steam at a high rate as hereinafter stated. However, the invention may be employed with any of the usual or suitable types of superheater for the steam and preheaters for the feed water and for the combustion air.

The members which close the spaces between the tubular members 28 serve to prevent the escape of combustion gases from between the tubular members and also to conduct heat to the tubular members and the water circulating therein.

The outer walls which surround the hollow walls as described provide an air space for preheating the air used to support combustion. The use of such preheated air raises the efficiency of the boiler and utilizes heat which would ordinarily be lost by radiation to the surrounding atmosphere in boilers made according to the usual practice prior to his invention.

Figure 9:
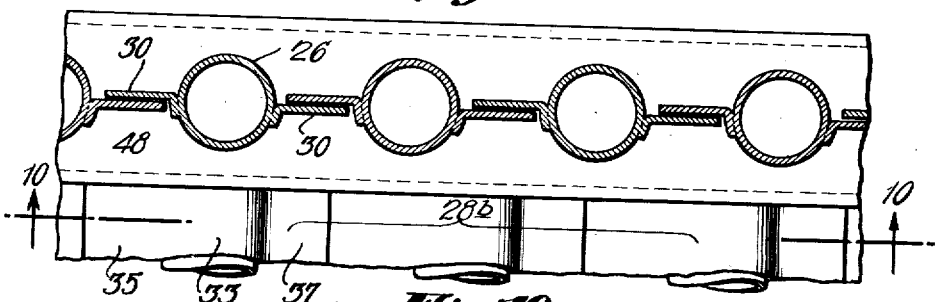
Fig. 9 is an enlargement of a portion of the horizontal section, Fig. 2.
Figure 10:
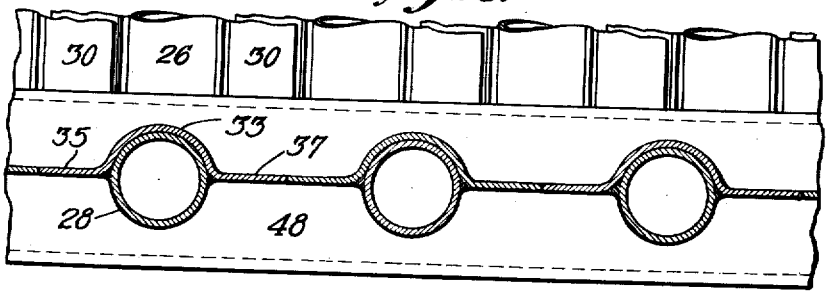
Fig. 10 is a vertical section on the line 10—10, Fig. 9.

The hollow wall construction herein described can also be used for the floor of the boiler as indicated at $28^b$ in Figs. 2 and 9. This is advantageous when liquid or powdered fuel is used as it permits the circulation of water through the floor bottom and prevents the adhesion of slag thereto. This it does by keeping the temperature in the adjacent zone below the point at which the refractory mineral particles would be melted or rendered plastic and capable of adhering or sticking tightly to the metal bottom.

Such floors, with water circulating through them, have an important effect supplementary to the side walls in adapting the boiler to powdered coal or similar nozzle-firing.

The chief purpose is to operate at a very high percentage of rating so as to use the heat units released by the powdered coal most efficiently. To generate steam at a high rate, a flame would be used of such volume and intensity as to sustain a temperature which would melt or slag the mineral in the fuel. This is prevented (in the zones immediately adjacent to the walls) by the cooling effect of the water walls through which a rapid circulation is maintained. The floor or bottom also presents to the radiant heat in the furnace a metallic surface of high heat-absorbing and conducting character. The heat units are utilized and removed so fast as to moderate the temperature in the furnace. Mineral ashes or other products of combustion which fall on the bottom, even though they remain exposed to the radiant heat, are prevented from slagging and sticking to the metal and are deposited in such a comparatively dry condition that they can be readily removed from time to time through any usual or suitable openings.

These water floors, therefore, serve not only to absorb and utilize a part of the heat, but also to prevent excessive temperature of the flame and to prevent slagging of the ashes which are deposited on the floor.

The unit described, consisting of the tubular member 28 with longitudinal flanges 30 welded thereon may be used not only in the walls and floors of boilers as indicated, but also in various other structures and locations. For welding the flange on the tube, arc welding or various other known welding methods may be employed. The same is true of the design shown in Fig. 7, with the flanges 35 and 37 formed by opposite portions of a common plate 33. And the opposite flanges of such units may be in the same plane as indicated in Figs. 6 and 7, or they may be set at an angle to each other as in the corner plates or flanges $30^a$. These separate units are not claimed herein, being claimed in separate applications which he filed Nos. 715,369 and 720,734.

Fig. 9 is an enlargement of the portion of the floor $28^b$ shown in Fig. 2. In this floor the form of flanged tubes shown in Fig. 7 is used, with flanges 35 and 37 constituting opposite extensions of a common plate 33 welded to the tube. The edges of the flanges of adjacent units are brought practically together, with only the necessary clearance to avoid their binding on each other and to ensure freedom of separate movement.

Such units are separately formed and then assembled, the overlapping flanges being free to move with relation to each other so as to accommodate the distortion or unequal expansion which occurs under the heat of the furnace. Being unconnected, the units are readily assembled. Also they are capable of separate replacement in case of injury to any one of them. Although they are preferably in contact as shown, they do not make a gas-tight joint. The closure is sufficient to permit the circulation of air for preheating it as described. But such an air space between the inner and the outer walls is useful in insulating the latter from excessive heating even without any circulation of air between them.

The solid heat-conducting plates between the tubes are preferably welded to the sides of the latter at points between the rear and ing, are of less width than the diameter of the tubes and can be kept within such limits as to avoid destruction by the fire. In a copending application No. 642,427, filed May 31, 1923, he described a structure which is generally similar to that covered herein, but with certain modifications and additional features; the generic claims applicable to both structures being made in the present case.

In another application No. 61,386, referred to above, he described and claimed a steam generator having side walls of upright tubes forming a complete enclosure of a combustion engine.

While there has been described quite specifically the details of the boiler illustrated, it is not to be construed that one is limited thereto as changes in arrangement and substitution of equivalents may be made by those skilled in the art without departing from the invention as defined in the appended claims.

What is claimed is:

1. In a boiler or the like, a wall comprising a multiplicity of pipes arranged in spaced relationship alongside one another and each pipe having a longitudinally extending plate secured thereto which overlaps the plate of the adjacent pipe, said plates being arranged to substantially or approximately close the space between the adjacent pipes and to conduct heat thereto, the pipes with their attached plates being free to move with relation to one another.

2. In a boiler or the like, a wall comprising a multiplicity of tubular members arranged in a row alongside one another and adapted to have a fluid circulated therethrough, and means secured to said tubular members for substantially or approximately closing the spaces between them and conducting heat to the fluid in them, said conducting means being free to move with relation to one another.

3. In a boiler wall construction, a multiplicity of tubular members spaced apart from one another and connected together at their ends to permit the circulation of water therethrough, plate members secured to the adjacent tubular members and arranged to substantially or approximately close the space between said adjacent tubular members yet permit relative movement due to expansion and contraction.

4. A boiler or the like comprising a number of separately formed units comprising tubular members with longitudinal flanges united thereto, said units being assembled parallel to each other with said flanges overlapping each other between the tubular members and free to move with relation to each other.

5. In a boiler or the like, a wall comprising a multiplicity of vertical pipes communicating with horizontal headers, overlapping members secured to said pipes to close the spaces between them and to conduct heat to the fluid in them, the pipes with their attached plates being separate from one another.

6. A boiler for generating steam at high pressure rapidly comprising a furnace wall exposed on its inner face only to the furnace gases and comprising a number of separately formed units consisting of vertically extending tubular members through which the water of the boiler circulates with longitudinal flanges united thereto, said units being assembled parallel to each other with said flanges substantially or approximately closing the space between the tubular members said units being free to move with relation to one another.

7. A boiler adapted for generating steam at high pressure having a combustion chamber with a wall comprising a multiplicity of upright tubular members spaced apart from one another and arranged for water circulation therethrough, metal plates secured to said members and exposed to the radiant heat of the burning fuel and adapted to transmit heat to said tubular members, the tubular members being separately expansible in combination with burners of the nozzle type for projecting powdered, liquid or gaseous fuel into the combustion chamber.

8. A boiler adapted for generating steam at high pressure having a combustion chamber with a wall comprising a number of separate units composed of tubular members with longitudinal flanges united thereto, said units being assembled parallel to each other with said flanges between the tubular members, said units being free to move with relation to one another and being arranged for water circulation through the tubular portions thereof, said flanges being exposed to the radiant heat of the burning fuel and adapted to transmit heat to the tubular members, in combination with burners of the nozzle type for projecting powdered, liquid or gaseous fuel into the combustion chamber.

9. A boiler adapted for generating steam at high pressure having an outer furnace wall and, between the outer wall and the combustion chamber, an inner wall comprising a multiplicity of tubular members spaced apart from one another and arranged for water circulation therethrough, metal plates secured to said members and exposed to the radiant heat of the burning fuel and adapted to transmit heat to said tubular members, the tubular members being separately expansible, in combination with burners of the nozzle type for projecting powdered, liquid or gaseous fuel into the combustion chamber.

10. A boiler adapted for generating steam at high pressure having an outer wall and, between the outer wall and the combustion chamber an inner wall comprising a multiplicity of separate units composed of tubular members with longitudinal flanges united thereto, said units being free to move with relation to one another, in comb nation with burners of the nozzle type for projecting powdered, liquid or gaseous fuel into the combustion chamber.

11. A boiler having water tubes between which the products of combustion pass and a combustion chamber below said tubes and having a forwardly offset portion below the level of such tubes including sides of water tubes and an arch of water tubes communicating with those at the s des, both said sides and arch being exposed to the radiant heat of the burning fuel and communicating with the circulating system of the boiler.

12. A steam generator including a combustion chamber for the fuel having a wall composed of substantially upright tubes connected into the circulation of the generator, said tubes be ng spaced apart a distance not substantially greater than their diameter, and metal extensions from said tubes practically closing the space between them so that only the inner face of such wall is exposed to the direct radiant heat of the burning fuel, the tubes of said wall being separate from and free to move with relation to one another.

13. A boiler having inclined, approximately horizontal, water tubes between which the products of combustion pass and a combustion chamber below said water tubes, with a wall of said chamber comprising a multiplicity of upr ght tubular members spaced apart from one another and arranged for water circulation therethrough, and metal extensions secured to said members and exposed to the radiant heat of the burning fuel and adapted to transmit heat to said tubular members, said tubular members being separate from and free to move with relation to one another.

14. A boiler having water tubes between which the products of combustion pass and a combustion chamber in advance of said water tubes, with a wall of said chamber comprising a multiplicity of tubular members arranged for water circulation therethrough and exposed to the radiant heat of the burning fuel, the boiler having a forwardly offset portion below the level of the tubes through which the products of combustion pass, said offset portion including an arch above the forward portion of the combustion chamber, said arch comprising a water wall exposed to the radiant heat of the burning fuel and communicating with the circulating system of the boiler.

15. A boiler having an overhead bank of tubes through which the furnace gases pass to heat said tubes by convection and having below said bank of tubes, a combustion chamber with an arch of water tubes and front, back and side walls, all comprising vertically extending tubes connected into the circulation of the boiler and exposed to the direct radiant heat of the burning fuel and presenting a complete metal face to the furnace.

16. A steam generator including approximately horizontal water tubes heated by convection and a furnace with a combustion chamber below said tubes and having a wall composed of substantially upright tubes connected into the circulation of the boiler, said tubes being spaced apart a distance not substantially greater than their diameter, and metal extensions from said tubes united thereto with good heat-conducting joints and practically closing the space between the tubes and providing an increased area exposed to the direct radiant heat of the burning fuel and conducting such heat to the tubes, each of said extensions being limited in width as a maximum to the diameter of the tubes, the tubes and extensions constituting a substantially closed wall exposed on the inner face only to the combustion gases.

17. A boiler adapted for generating steam at high pressure having coal dust firing burners and having a combustion chamber wall of upright spaced steam generating water tubes with metallic extensions forming a continuous metallic face exposed to the direct radiant heat of the burning coal from said burners and adapted to collect a continuous coating of incandescent ash which avoids excessive cooling of the flame.

18. A steam generator including in combination approximately horizontal overhead water tubes heated by convection and a furnace having a combustion chamber below said overhead tubes, side walls of said combustion chamber being composed of rows of upright tubes connected into the circulation of the generator and exposed to the heating gases on the inner sides only of said rows of tubes and the bottom being composed of similar transverse tubes, in combination with burners of the nozzle type for projecting powdered, liquid or gaseous fuel into the combustion chamber, the bottom being exposed directly to the heating flame.

19. A steam generator including in combination water tubes heated by convection and a furnace having a combustion chamber, side walls of said combustion chamber being composed of rows of upright tubes connected into the circulation of the generator and exposed to the heating gases on the inner sides only of said rows of tubes and the bottom being composed of similar transverse tubes, in combination with burners of the nozzle type for projecting powdered, liquid or gaseous fuel into the combustion chamber, the bottom being exposed directly to the heating flame.

20. A steam generator including in combination water tubes heated by convection and a furnace having a combustion chamber, side walls of said combustion chamber being composed of rows of upright tubes connected into the circulation of the generator and exposed to the heating gases on the inner sides only of said rows of tubes, and the bottom of said combustion chamber comprising water tubes connected into the circulation of the generator and presenting a substantially closed metallic heat-absorbing face also exposed to the heating gases in combination with burners of the nozzle type for projecting powdered, liquid or gasous fuel into the combustion chamber, the bottom of the chamber being exposed directly to the heating gases.

21. In a boiler wall construction, a multiplicity of upright steam generating water tubes spaced apart from one another and connected at their ends to permit the circulation of water therethrough, and metallic extensions on said tubes arranged to extend substantially or approximately across the spaces between said tubes yet permit relative movement of the tubes due to expansion and contraction.

22. In a boiler wall construction, a multiplicity of upright steam generating water tubes spaced apart from one another and connected at their ends to permit the circulation of water therethrough, and metallic extensions on said tubes arranged to extend substantially or approximately across the spaces between said tubes yet permit ready removal and replacement of separate tubes.

23. In a boiler wall construction, a multiplicity of upright steam generating water tubes spaced apart from one another and connected at their ends to permit the circulation of water therethrough, and metallic members arranged to extend substantially or approximately across the spaces between said tubes so as to form an unbroken metallic heat-absorbing surface constituting the inner face of the wall, the said metallic members of the wall being in heat-conducting but impermanent engagement with each other.

24. A boiler adapted for generating steam at high pressure having an outer furnace wall and, between the outer wall and the combustion chamber, an inner wall comprising a multiplicity of tubular members spaced apart from one another and arranged for water circulation therethrough, metal plates secured to said members and exposed to the radiant heat of the burning fuel and adapted to transmit heat to said tubular members, the tubular members being separately expansible, in combination with burners of the nozzle type for projecting powdered, liquid or gaseous fuel into the combustion chamber, the space between said outer and inner walls serving as a channel for combustion air, and openings between the tubes of the inner wall for admitting air from said channel to the combustion chamber.

25. A boiler adapted for generating steam at high pressure having an outer wall and, between the outer wall and the combustion chamber, an inner wall comprising a multiplicity of separate units composed of tubular members with longitudinal flanges united thereto, said units being free to move with relation to one another, in combination with burners of the nozzle type for projecting powdered, liquid or gaseous fuel into the combustion chamber, the space between said outer and inner walls serving as a channel for combustion air, and openings between the tubes of the inner wall for admitting air from said channel to the combustion chamber.

26. In a finely divided fuel burning boiler furnace, an outer wall, a group of water tubes at the inner side of said wall arranged to form with said wall a channel for combustion air, with openings between the tubes for admission of such air to the combustion chamber.

27. In a finely divided fuel burning boiler furnace, an outer wall, a group of finned tubes at the inner side of said wall arranged to form with said wall a channel for combustion air, the fins being interrupted to provide ports for admission of such air to the combustion chamber.

28. In a pulverized coal burning boiler combustion chamber, means introducing a stream of pulverized coal thereinto, an outer wall, a group of tubes arranged to form with said wall a channel with lateral openings and means whereby combustion air may be supplied to the channel to pass laterally thereout of through said openings.

29. A boiler having a combustion chamber with a wall of upright steam-generating water tubes, the combustion space in said chamber being practically unobstructed, said wall presenting a substantially continuous metal face composed at least in part of the outer surfaces of said tubes, with openings at intervals between the tubes forming passages between a source of air and said unobstructed combustion space and burners of the nozzle type arranged to project powdered, liquid or gaseous fuel into said unobstructed combustion space.

30. A boiler having a combustion chamber with a wall of upright steam-generating water tubes, said wall presenting a substantially continuous metal face with burner openings at intervals between the tubes, and burners of the nozzle type located in said openings for projecting powdered, liquid or gaseous fuel into the combustion chamber.

31. A boiler having a combustion chamber with a wall of upright steam-generating water tubes, said wall presenting a substantially continuous metal face with air-admission openings and burner openings between the tubes, and burners of the nozzle type located in said openings for projecting powdered, liquid or gaseous fuel into the combustion chamber.

32. A boiler having a combustion chamber with a wall of upright steam-engineering water tubes spaced apart with metal fillers between them, the combustion space in said chamber being practically unobstructed, said wall presenting a substantially continuous metal face composed of the surfaces of said tubes and fillers, with openings at intervals between the tubes forming passages between a source of air and said unobstructed combustion space, and burners of the nozzle type arranged for projecting powdered, liquid or gaseous fuel into said combustion space.

33. A steam generator having a combustion chamber enclosed within a wall, a part of the enclosing wall being composed of upright steam generating tubes and the remainder being composed of superheater tubes, said wall presenting a substantially continuous metal face to the heating gases within the chamber.

34. A steam generator including in combination approximately horizontal overhead water tubes heated by convection and a furnace having a combustion chamber below said overhead tubes, said furnace being enclosed within a wall, a part of the enclosing wall being composed of upright steam generating tubes and the remainder being composed of superheater tubes, said wall presenting a substantially continuous metal face to the heating gases within the chamber.

In witness whereof, we have hereunto signed our names.

THOMAS E. MURRAY, JR.,
JOSEPH B. MURRAY,
JOHN F. MURRAY,
*Executors of the Estate of Thomas E. Murray, Deceased.*

CERTIFICATE OF CORRECTION.

Reissue No. 18,748. February 28, 1933.

THOMAS E. MURRAY, JR. ET AL, EXECUTORS OF THOMAS E. MURRAY, DECEASED.

It is hereby certified that error appears in the printed specification of the above numbered patent requiring correction as follows: Page 8, line 7, claim 32, for "steam-engineering" read "steam-generating"; and that the said Letters Patent should be read with this correction therein that the same may conform to the record of the case in the Patent Office.

Signed and sealed this 23rd day of May, A. D. 1933.

(Seal)

M. J. Moore.
Acting Commissioner of Patents.